Nov. 13, 1928.

E. A. ZUNDEL

CLOSET SEAT 1,691,176

Filed Jan. 2, 1926

WITNESSES
M. E. Downey
C. L. Naal

INVENTOR
Eugene A. Zundel
By R. S. Caldwell
ATTORNEY

Nov. 13, 1928.
E. A. ZUNDEL
1,691,176
CLOSET SEAT
Filed Jan. 2, 1926
2 Sheets-Sheet 2
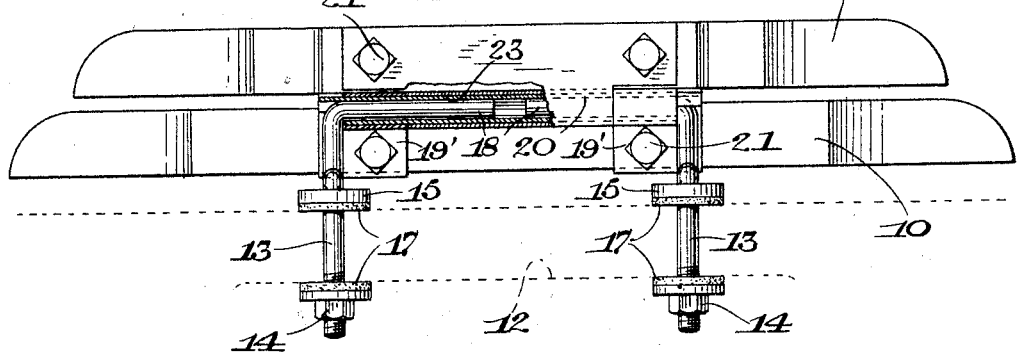
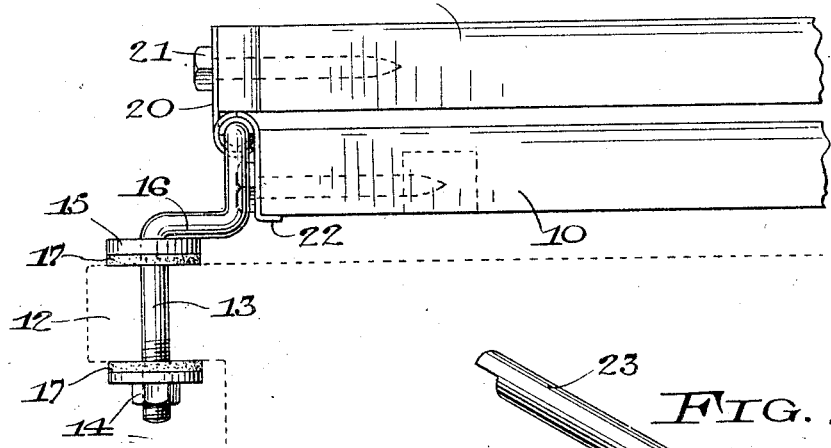
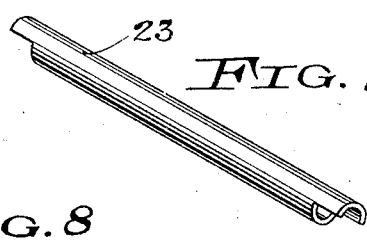
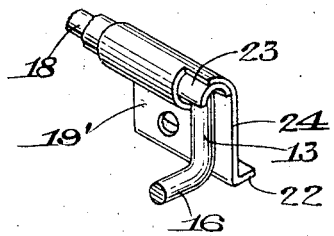
WITNESSES
M. E. Downey
C. L. Naal
INVENTOR
Eugene A. Zundel
By R. S. Caldwell
ATTORNEY Patented Nov. 13, 1928.

1,691,176

UNITED STATES PATENT OFFICE.

EUGENE A. ZUNDEL, OF CHICAGO, ILLINOIS.

CLOSET SEAT.

Application filed January 2, 1926. Serial No. 78,904.

This invention relates to closet seats and has for its object to provide a hinge construction for the seat member and the cover member that will be strong and durable and at the same time be concealed from view to a maximum extent, making a neat and ornamental appearance.

Another object of the invention is to make such parts of the hinge as may be seen of a construction adapted to take and retain a high finish and readily accessible for cleaning so that it may be kept permanently in its new state.

With the above and other objects in view the invention consists in the closet seat as herein claimed and all equivalents.

Referring to the accompanying drawings in which like characters of reference indicate the same or similar parts in different views, Fig. 1 is a bottom view of a closet seat constructed in accordance with this invention;

Fig. 5 is a rear view partly sectioned of a modification of the invention;

Fig. 6 is an end view of the hinge thereof;

Fig. 7 is a perspective view of the aligning bushing, and

Fig. 8 is a detailed perspective view of one of the hinge members.

Figure 1:
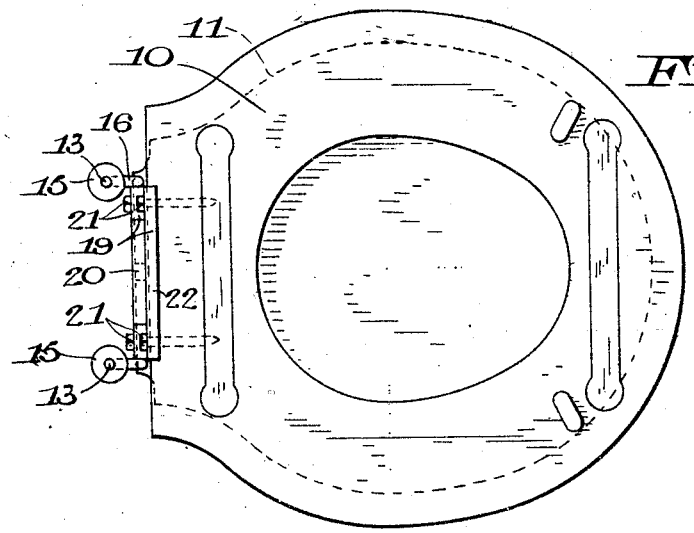
Figure 2:
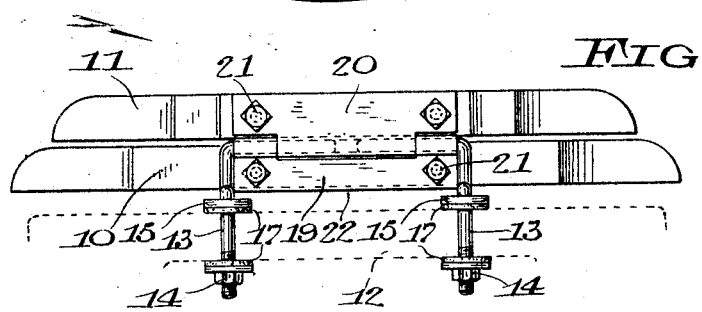
Fig. 2 is a rear view thereof.

In these drawings, 10 indicates a closet seat member and 11 the cover therefor, the two being connected together by a hinge construction which also pivotally mounts them on the closet 12.

Hinge posts 13 pass through the flange of the closet body 12 and have nuts 14 threaded on their lower ends and heavy washers 15 fitting thereon against a shoulder 16 formed by a forwardly bent portion of said posts, there being cushioning washers 17 of rubber or other suitable material between the flange of the closet body and said washers 15 and between the flange and the usual washers for nuts 14 to protect the vitreous surface from injury by the clamping parts. The posts 13, after bending forwardly to produce the horizontal shoulders 16, bend upwardly to about the height of the top of the closet seat and then bend horizontally to form pintle arms 18 extending toward each other and in alignment.

Figure 3:
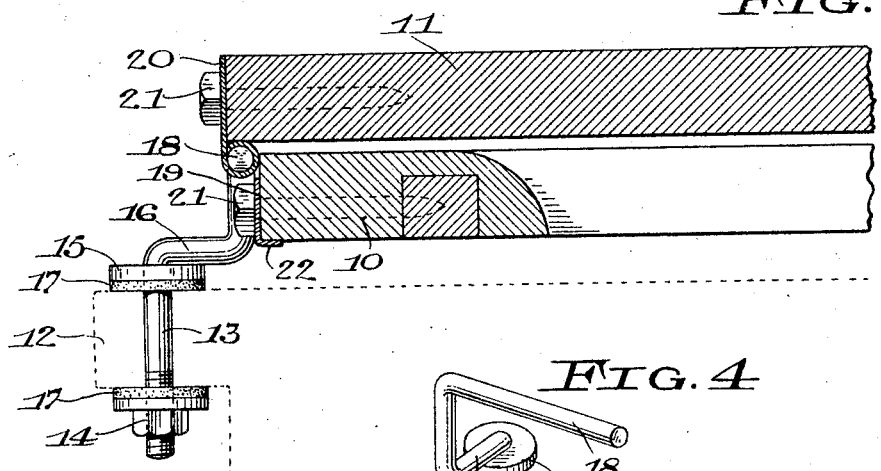
Fig. 3 is a transverse sectional view of the hinge.
Figure 4:
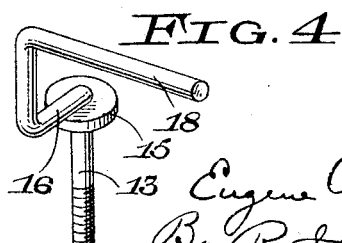
Fig. 4 is a perspective view of one of the hinge posts.

Vertical hinge plates 19 and 20 are secured to the rear edges of the closet seat member 10 and the cover 11 respectively, preferably by means of lag screws 21 of considerable length, and their edges are bent to form offset pintle-receiving tubes or barrel sections disposed in the manner usual with butt hinges, but with this exception: That, while the hinge member 20 for the cover is rolled forwardly, the hinge member 19 for the seat member is rolled rearwardly, thus placing the two hinge plates on opposite sides of the pintles 18 of the hinge posts when said pintles are threaded through the registering barrel sections and causing the hinge plates to lie in parallel vertical planes spaced apart, as shown in Fig. 3. This permits the cover 11 to rest directly upon the pintle arms of the hinge posts with only the metal forming the pintle tube intervening while the closet seat member correspondingly rests directly on a forwardly bent horizontal flange 22 formed by the edge of the hinge member 19. In this manner the weight on the seat member and on the cover is taken directly by the hinge posts without depending on the fastening means.

By the use of this hinge construction the pivotal axis of the seat and cover members is projected forward well in advance of the openings for the posts so that said members may stand upright even in the presence of a flushing tank and still this offset is not such as to weaken the structure on account of the bearing that the posts have by reason of their bent shoulders resting on the heavy washers 15. The horizontal portions of the posts, being re-enforced by their bearing on the washers 15, are strengthened against any possible bending. This broad bearing for the posts furthermore protects the pottery ware from local strains that would be liable to crack it.

The object of the invention to make the hinge construction inconspicuous is accomplished by the forward offset of the hinge posts and the arrangement of the hinge plates for, when viewed from above and from in front of the seat, only the edge of the hinge plate 20 may be seen with the cover closed and only the barrel or tube portions of the hinge may be seen with the cover open and only portions of the hinge posts and the flange 22 may be seen with both cover and seat member raised. As the surfaces of the hinge posts and the hinge plates are plain flat or rounded surfaces, they are easily accessible to be kept clean and polished to preserve their original high finish whether it is nickel-plate or otherwise.

In the modification of the invention shown in Figs. 5 to 8 inclusive an aligning bushing 23 consisting of a metal tube is fitted within the barrel portion of the hinge and extends from one end of the hinge plates to the other with its end portions half cut away and the remaining semi-circular parts extending beyond the barrel of the hinge to form shields for hiding the hinge posts. In this form of the invention it is also shown that the lower plates 19' and that they may each have end extensions 24 projecting beyond the ends of hinge member may be made of two separate the hinge barrel flush with the edge of the semi-circular projections of the aligning bushing 23 to co-operate therewith in shielding the hinge post from view.

The aligning bushing 23, besides forming a shield for hiding the hinge posts, assures alignment of the sections of the hinge barrel and avoids any possibility of the pintle arms binding therein.

With this form of the invention, as well as with the other, the seat and cover are provided with a hinge mounting of great strength and durability and effectively hidden from view, the shields formed by the projecting ends of the aligning bushing and the lower hinge plate extensions serving as an even greater protection for hiding the hinge posts beneath and behind them.

What I claim as new and desire to secure by Letters Patent is:

1. In combination with a wooden closet seat and cover, a hinge formed of hinge plates secured to the rear edges of the seat and cover respectively and having aligned barrel sections, and hinge posts with horizontal pintle arms extending into the barrel sections from the opposite ends thereof, the hinge plates when the cover and seat are closed being arranged in vertical parallel planes spaced apart a distance equal to the diameter of the hinge barrel.

2. In combination with a wooden closet seat member and a cover member, hinge plates secured to the rear edges thereof and formed with aligned barrel sections back of the seat member hinge plate and in front of the cover member hinge plate, and hinge posts having horizontal pintle arms fitting in said aligned barrel sections.

3. In combination with a wooden closet seat member and a cover member, hinge plates secured to the back edges thereof and forming aligned barrel sections, hinge posts having horizontal pintle arms projecting into the aligned barrel sections from the opposite ends thereof, and a forwardly projecting flange at the lower edge of the bottom hinge plate on which the seat member bears, the cover member bearing on the barrel sections.

4. In combination with a closet seat member and a cover member, hinge members secured to the rear portions thereof and forming aligned barrel sections, hinge posts formed of rods each bent to provide offset vertical portions and a horizontal pintle arm, said pintle arms extending into the barrel sections from opposite ends thereof, and nuts threaded on said posts.

5. In combination with a closet seat member and a cover member, hinge members secured to the rear portions thereof and forming aligned barrel sections, hinge posts formed of rods each bent to provide offset vertical portions connected by a horizontal shoulder portion and the upper vertical portion having a horizontal pintle arm, said pintle arms extending into the barrel sections from opposite ends thereof, washers fitting on the lower vertical portions of the hinge posts and against the shoulder portions thereof, and clamping nuts threaded on the lower ends of the hinge posts.

6. In combination with a closet seat member and a cover member, hinge members secured to the rear portions thereof, the hinge portions of both members forming barrel sections in alignment with each other, a tubular aligning bushing fitting in the barrel sections, and hinge posts having horizontal pintle arms extending into the aligning bushing from opposite ends thereof.

7. In combination with a closet seat member and a cover member, hinge members secured to the rear portions thereof and forming aligned barrel sections, a tubular aligning bushing fitting in the barrel sections with half cut away projections at its ends extending beyond the barrel sections and forming shields, and hinge posts fitting within the shields of the aligning bushing and having horizontal pintle arms fitting in the aligning bushing, said shields serving to hide the hinge posts.

8. In combination with a closet seat member and a cover member, hinge plates secured to the rear edges thereof and forming aligned barrel sections, a tubular aligning bushing fitting in the barrel sections and having half cut away projecting end portions forming shields projecting beyond the barrel sections, and hinge posts fitting within the shield projections of the aligning bushing and having horizontal pintle arms projecting into the aligning bushing, there being end extensions on the lower hinge plate co-operating with the shields to hide the hinge posts.

In testimony whereof, I affix my signature.

EUGENE A. ZUNDEL.